United States Patent [19]

Nakamichi

[11] Patent Number: 4,639,812
[45] Date of Patent: Jan. 27, 1987

[54] MAGNETIC HEAD AND APPARATUS FOR AUTOMATICALLY ADJUSTING THE AZIMUTH POSITION THEREOF

[75] Inventor: Niro Nakamichi, Tokyo, Japan

[73] Assignee: Nakamichi Corporation, Tokyo, Japan

[21] Appl. No.: 544,745

[22] Filed: Oct. 24, 1983

[30] Foreign Application Priority Data

Nov. 8, 1982 [JP] Japan .................. 57-194613

[51] Int. Cl.[4] ............... G11B 5/147; G11B 5/127; G11B 5/00; G11B 20/20
[52] U.S. Cl. .................. 360/126; 360/125; 360/76; 360/119; 360/123
[58] Field of Search ............... 360/76, 123, 125, 126, 360/105, 106, 107, 137, 111, 121, 75, 124

[56] References Cited

U.S. PATENT DOCUMENTS

| | | | |
|---|---|---|---|
| 3,384,881 | 5/1968 | Frost et al. | 360/125 |
| 3,624,313 | 11/1971 | Dekoster | 360/122 |
| 3,679,839 | 7/1972 | Suzuki et al. | 360/126 |
| 3,763,329 | 10/1973 | Linke | 360/126 |
| 3,842,494 | 10/1974 | Chiba et al. | 360/124 |
| 3,946,440 | 3/1976 | Saito | 360/118 |
| 4,055,849 | 10/1977 | Hickok | 360/70 |
| 4,072,994 | 2/1978 | Takashima | 360/124 |
| 4,086,639 | 4/1978 | Toshimitsu | 360/126 |
| 4,097,910 | 6/1978 | Lafevers et al. | 360/126 |
| 4,101,937 | 7/1978 | Jenkins | 360/76 |
| 4,115,827 | 9/1978 | Gooch | 360/125 |
| 4,245,268 | 1/1981 | Toshimitsu | 360/124 |
| 4,258,398 | 3/1981 | Bixby et al. | 360/76 |
| 4,317,144 | 2/1982 | De Niet et al. | 360/109 |
| 4,460,934 | 7/1984 | Yamada | 360/76 |

FOREIGN PATENT DOCUMENTS

| | | | |
|---|---|---|---|
| 240098 | 7/1960 | Australia | 360/124 |
| 2064540 | 7/1971 | Fed. Rep. of Germany | 360/123 |
| 1173408 | 2/1959 | France | 360/125 |
| 1309568 | 10/1962 | France | 360/76 |
| 54-115121 | 7/1979 | Japan | 360/119 |
| 57-195314 | 12/1982 | Japan | 360/121 |
| 58-102325 | 6/1983 | Japan | 360/76 |
| 59-58612 | 4/1984 | Japan | 360/124 |
| 59-84321 | 5/1984 | Japan | 360/125 |
| 0820201 | 9/1959 | United Kingdom | 360/125 |
| 0575680 | 11/1977 | U.S.S.R. | 360/125 |
| 0633065 | 11/1978 | U.S.S.R. | 360/125 |
| 036667 | 6/1981 | U.S.S.R. | 360/121 |

OTHER PUBLICATIONS

Elektroakustik mit HiFi, Funkschan Mag. (Germany), No. 25, Dec. 5, 1980, pp. 91–92, "Automatische Tonkopf-Nachführung", by Dolberg.

*Primary Examiner*—John H. Wolff
*Assistant Examiner*—Alfonso Garcia
*Attorney, Agent, or Firm*—Flynn, Thiel, Boutell & Tanis

[57] ABSTRACT

A magnetic head has a core which has first and second core parts on opposite sides of a vertically extending gap, the core parts each consisting of upper and lower core pieces. The upper core piece of the first core part and the lower core piece of the second core part each have a thickness in a direction extending parallel to the gap which is greater than the thickness of the associated core piece, and each has a portion encircled by a coil. The magnetic head is supported for movement in directions which effect adjustment of the azimuth position thereof, and an arrangement responsive to signals from the two coils automatically effects positional adjustment of the magnetic head so as to effect correct azimuth positioning thereof relative to a recorded audio signal on a single track of a recording tape which is being reproduced by the core of the magnetic head.

5 Claims, 4 Drawing Figures

MAGNETIC HEAD AND APPARATUS FOR AUTOMATICALLY ADJUSTING THE AZIMUTH POSITION THEREOF

BACKGROUND OF THE INVENTION

1. Field of the Invention

The present invention relates to a magnetic head, particularly to a reproducing head, for example, a magnetic head suitable to its automatic azimuth adjustment.

2. Description of the Prior Art

For example, if the azimuth of a reproducing head is not correctly adjusted, phase difference is produced between reproduced signals from the left and right recording tracks and also playback characteristics in high frequency regions is worsened. In order to overcome these problems, an apparatus for adjusting the azimuth of a reproducing head by using recording signals has been proposed, for example, in U.S. Pat. No. 4,317,144.

This apparatus scans separately the upper and the lower half of one of the tracks in a recording tape which is to be reproduced, for example the recording track for the right channel, by means of a reproducing head and detects difference in phase between reproduced signals obtained respectively from the halves and ajusts automatically the azimuth of said reproducing head in accordance with difference in phase.

However, since this proposed reproducing head has two magnetic head constructions, which are independent of each other, corresponding to each of the divided upper and lower halves of one recording track, it construction is complicated and lacking in practical utility.

OBJECT OF THE INVENTION

The object of this invention is, therefore, to provide a magnetic head having a simple construction and suitable to automatic azimuth adjustment.

SUMMARY OF THE INVENTION

In order to achieve this object, the magnetic head according to this invention comprises a core having a width corresponding to the width of at least one recording track on a magnetic tape and pick-up coils, said core consisting of a pair of right and left haves, each of said halves being divided in the direction transverse with respect to said track into two portions superimposed on each other, the dividing ratios being different for the right and the left half, said pick-up coils, being wound on the greater portion of said divided halves.

Hereinbelow, this invention will be described more in detail, referring to an embodiment illustrated in the drawing.

DETAILED DESCRIPTION OF A PREFERRED EMBODIMENT

Figure 1:
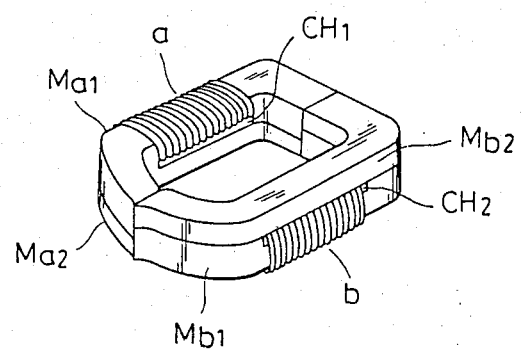
FIG. 1(a) is a perspective view of a magnetic head according to this invention.
FIG. 1(b) is a cross-sectional view of the magnetic head shown in FIG. 1(a)
Figure 1:
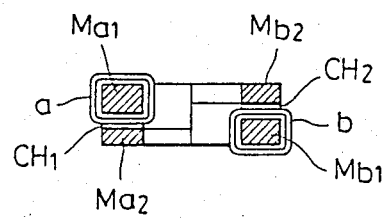

FIGS. 1(a) and 1(b) show a magnetic head according to this invention, represented only by a part corresponding to one recording track. In these figures, $M_{a1}$ and $M_{a2}$ denote the upper and the lower portion, respectively, obtained by dividing the left half of the core, and $M_{b1}$ and $M_{b2}$ denote the upper and the lower portion, respectively, obtained by dividing the right half of the core. The portions $M_{a1}$ and $M_{b1}$ are, for example, 0.4 mm thick and the portions $M_{a2}$ and $M_{b2}$ are 0.2 mm thick, so that the surface of the core consisting of these portions, which is opposite to a magnetic tape, corresponds to the width (0.6 mm) of a recording track for the stereo recording tapes. Thus, and as evident from FIG. 1(b), the ratio of the thickness of the upper core piece $M_{b2}$ to the thickness of the lower core piece $M_{b1}$ is less than 1, and the ratio of the thickness of the upper core piece $M_{a1}$ to the thickness of the lower core piece $M_{a2}$ is greater than 1. Also, as evident from FIGS. 1(a) and 1(b), each of the core pieces $M_{a1}$, $M_{a2}$, $M_{b1}$ and $M_{b2}$ is a generally U-shaped plate-like element. Each of the portions $M_{a1}$ and $M_{b1}$ having a larger division width among the above-mentioned portions is provided with a recess $CH_1$ or $CH_2$, and coils a and b are wound on them using these recesses $CH_1$ and $CH_2$, respectively.

When a magnetic head thus constructed is used as a reproducing head, these coils scan on the same recording track on a magnetic tape, and reproduce signals while dividing them into two parts. The azimuth of the reproducing head can be adjusted by means of reproduced signals $S_a$ and $S_b$ detected by the coils a and b, respectively.

Figure 2:
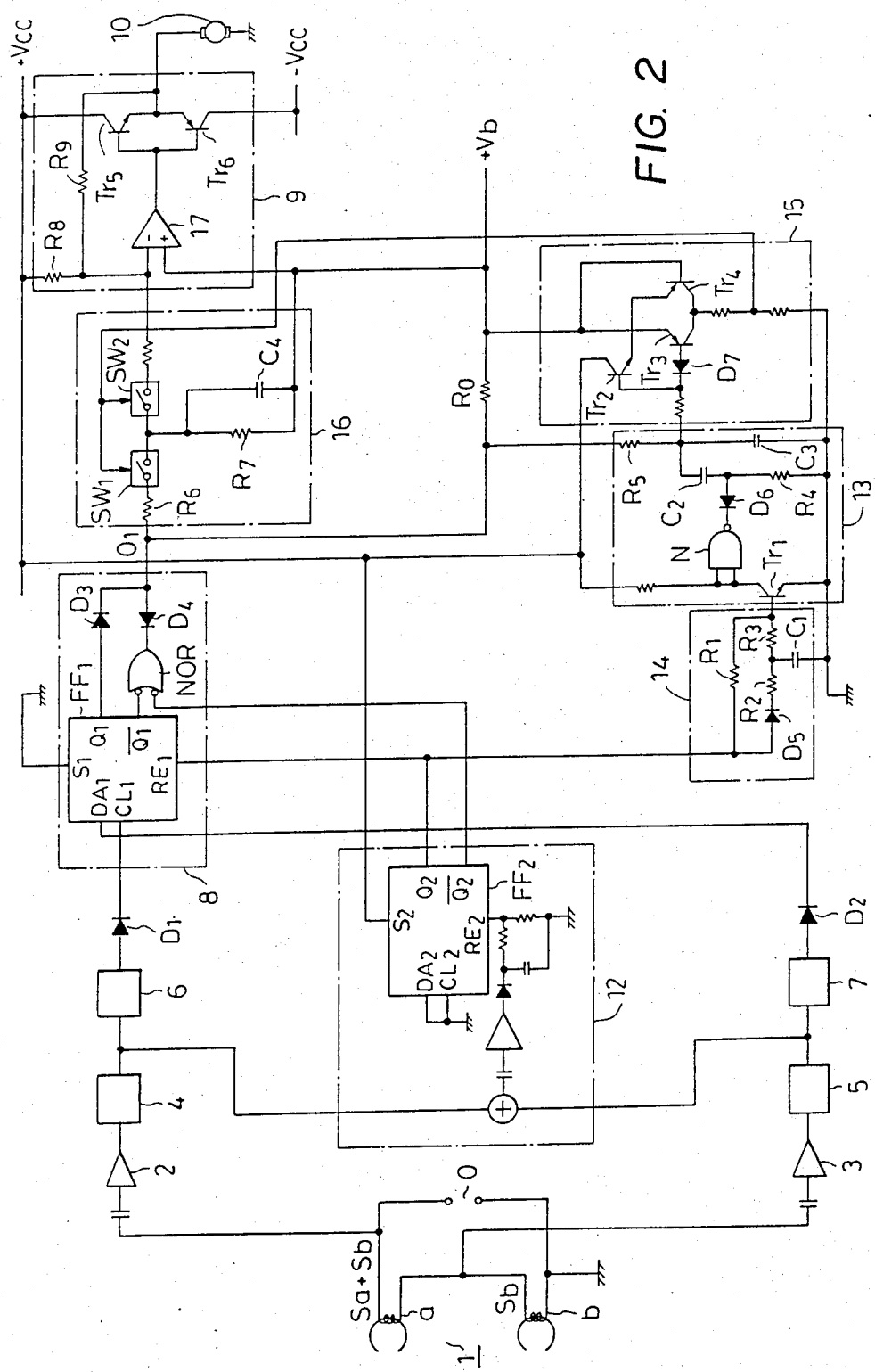
FIG. 2 is a circuit diagram of an example of azimuth adjustment devices for a magnetic head according to this invention.

FIG. 2 illustrates an example of circuits for automatically adjusting the azimuth of this reproducing head by using the above-mentioned magnetic head as a reproducing head. In the figure, 1 designates the reproducing head (for the right channel) shown in FIGS. 1(a) and 1(b). A composite signal $Sa+Sb$ of reproduced signals Sa and Sb obtained by this magnetic head is a reproduced signal for the right channel reproduced by a normal reproducing head and sent as an audio reproducing signal through an output terminal O to an audio signal playback circuit which is not shown in the figure.

The composite signal $Sa+Sb$ and the signal Sb serve as signals for azimuth adjustment. After having been amplified to the same level by amplifiers 2 and 3, these signals are applied to band pass filters 4 and 5, by means of which signal components from 2 kHz to 8 kHz are taken out. Thereafter, these signal components are transformed into rectangular wave signals by means of waveform transforming circuits 6 and 7. Positive components of these rectangular wave signals passing through diodes $D_1$ and $D_2$ are applied to a phase comparing circuit 8 as phase comparing signals.

The phase comparing circuit 8 compares the phase between said signals and produces at its output terminal $O_1$ inverting signals, which invert the output level to a high level Va or a low level 0 in response to advance or retardation in the phase of one signal relative to the other. The phase comparing circuit 8 consists of a D type flip-flop circuit $FF_1$, a NOR circuit NOR, and two diodes $D_3$ and $D_4$. The flip-flop circuit $FF_1$ comprises a data terminal $DA_1$ to which the output of the waveform transforming circuit 7 is applied through the diode $D_2$, a clock terminal $CL_1$ to which the output of the waveform transforming circuit 6 is applied through the diode $D_1$, a reset terminal $RE_1$, an output terminal $Q_1$, an inverse output terminal $\bar{Q}_1$, and a set terminal $S_1$ which is grounded. The output terminal $Q_1$ is connected through a diode $D_3$ directly with the output $Q_1$. The inverse output terminal $\bar{Q}_1$ is connected with one input terminal of the NOR circuit NOR. Further, the output terminal of the NOR circuit NOR is connected through a diode $D_4$ with the output $O_1$. The reset terminal $RE_1$ and the other input terminal of the NOR circuit NOR are connected respectively with the output terminal $Q_2$ and the inverse output terminal $\bar{Q}_2$ of another D type flip-flop circuit $FF_2$.

A level detecting circuit 12 makes the phase comparing circuit 8 operable, when the reproducing head 1 reproduces audio signals, that is, when the level of reproduced signals is greater than a predetermined level. At the same time this level detecting circuit 12 controls through a time constant circuit 14 a detecting sensitivity switching circuit 13 in response to the presence or absence of the audio reproduced signals and increases or decreases the detection sensitivity of a dead zone setting circuit 15. The level detecting circuit 12 comprises a D type flip-flop circuit $FF_2$, etc., and is so constructed that positive components of the composite signal of the outputs of the band pass filters 4 and 5 are applied to its reset terminal $RE_2$. On the other hand, both its data terminal $DA_2$ and clock terminal $CL_2$ are grounded, and furthermore, its set terminal $S_2$ is connected with a power supply $+Vcc$. For these D type flip-flop circuits $FF_1$ and $FF_2$ the DUAL D-TYPE FLIP FLOP (Product No. TC 4013BP) commercialized by Tokyo Shibaura Electric K.K. is suitable.

The time constant circuit 14 consists of resistors $R_1$, $R_2$ and $R_3$, a capacitor $C_1$ and a diode $D_5$ and in response to the output state of the output terminal $Q_2$ of the flip-flop circuit $FF_2$ charges the capacitor $C_1$ through the diode $D_5$ and a resistor $R_2$ or discharges it through the resistors $R_1$ and $R_3$. The values of these resistors and capacitor are so determined that a charging period is short while a discharging period is long.

The detection sensitivity switching circuit 13 comprises a switching transistor $Tr_1$, a diode $D_6$, a NAND circuit N, capacitors $C_2$ and $C_3$, resistors $R_4$ and $R_5$, etc., and in particular the resistor $R_5$ and the capacitor $C_3$ connected between the output $O_1$ of the phase comparing circuit 8 and grounded form a first integrating circuit giving information on the integral value of the aforementioned inverting signals.

Further, the dead zone setting circuit 15 is formed by a width comparator window circuit including transistors $Tr_2$, $Tr_3$ and $Tr_4$, a diode $D_7$, etc. This circuit 15 compares the integral output of the first integral circuit with a reference voltage level $V_b$ supplied from a reference voltage source $+V_b$ to the base of the transistor $Tr_4$. Thus, this circuit 15 produces high level signals to close analogue switches $SW_1$ and $SW_2$ of a switching circuit 16, which will be described later in more detail, when this integral output level is not within the dead zone level region relative to the reference voltage level $V_b$, and low level signals to open these switches when the integral output level is within the dead zone level region. The dead zone level region is set for this embodiment at $V_b \pm 1.2$ volt by the forward voltage drop of the transistors $Tr_2$ to $Tr_4$ and the diode $D_7$.

The output $O_1$ of the phase comparing circuit 8 connected through a resistor $R_0$ to the reference voltage source $+V_b$ is connected with the switching circuit 16. A capacitor $C_4$ inserted between the connection point of the two analogue switches $SW_1$ and $SW_2$ and the reference voltage source $+V_b$ forms a second integrating circuit together with a resistor $R_6$. A resistor $R_7$ connected parallel to the capacitor $C_4$ is a resistor for the discharge, when the analogue switches $SW_1$ and $SW_2$ are open.

The output of the second integrating circuit is supplied to a motor driving circuit 9, when the analogue switches $SW_1$ and $SW_2$ are closed. The output of the motor driving circuit 9 drives and controls an azimuth adjusting motor 10 which varies the azimuth of the reproducing head.

The motor driving circuit 9 is formed by an operational amplifier 17, transistors $Tr_5$ and $Tr_6$, resistors $R_8$ and $R_9$, etc. The output of the second integrating circuit is applied to the $(-)$ input terminal of the operational amplifier 17, whose $(+)$ input terminal is connected with the reference voltage source $+V_b$.

The voltage level of the power supply $\pm Vcc$, with which each of the collectors of the transistors $Tr_5$ and $Tr_6$ is connected, is set to be equal to the level $V_a$ of high level signals produced by the aforementioned D type flip-flop circuit $FF_1$. Further, the voltage levels $V_a$ and $V_b$ are so determined that $V_a = 2V_b$. The $(-)$ input terminal of the operational amplifier 17 is maintained at the voltage level $T_b$ and the value of the resistor $R_8$ is equal to that of the resistor $R_9$ so that the motor driving output is zero when the analogue switches $SW_1$ and $SW_2$ of the switching circuit 16 are open.

Figure 3:
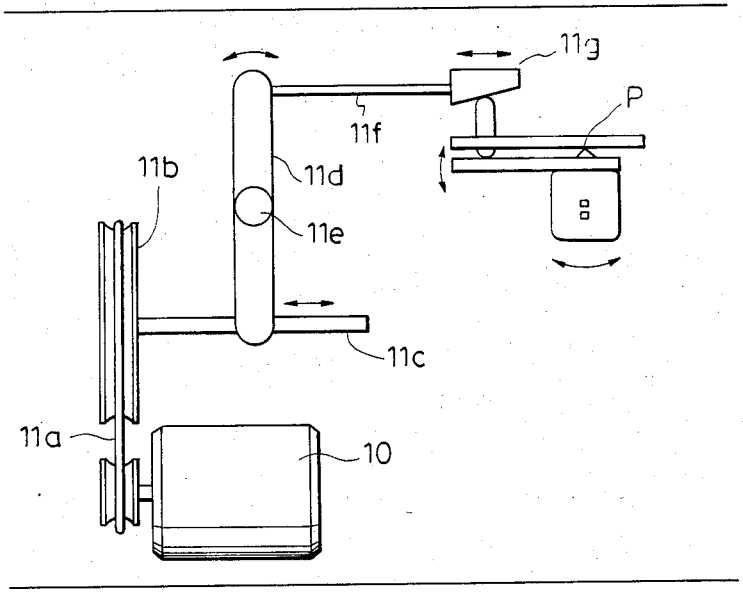
FIG. 3 is a plan view of an azimuth adjustment mechanism used with the circuit shown in FIG. 2.

FIG. 3 shows an example of the azimuth adjusting mechanism. When a motor 10 rotates, it turns a pulley 11b and a gear 11c through a belt 11a. A lever 11d, and end of which is engaged with the gear 11c, swings around a pivot axis 11e and displaces a wedge 11g through a link 11f. In this way, the reproducing head 1 is rotated around a supporting point P to vary the azimuth thereof.

In the above-mentioned construction, when audio reproducing signals are obtained from the reproducing head 1 and a high level signal is applied to the reset terminal $RE_2$ of the flip-flop circuit $FF_2$ of the level detecting circuit 12, the output states of the output terminal $Q_2$ and the inverse output terminal $\bar{Q}_2$ of the flip-flop circuit $FF_2$ change from the high level state to the low level state and from the low level state to the high level state, respectively. Since at the same time the input of the reset terminal $RE_1$ of the flip-flop circuit $FF_1$ in the phase comparing circuit 8 changes from the high level signal to the low level signal and the input of the other input terminal of the NOR circuit NOR changes from the low level signal to the high level signal, the output terminal $Q_1$ and the inverse output terminal $\bar{Q}_1$ of the flip-flop circuit $FF_1$ are supplied respectively with a high level signal $V_a$ and a low level signal 0, or with a low level signal 0 and a high level signal $V_a$ in accordance with advance or retardation in phase of said phase comparing signal (an input to the data terminal $DA_1$) relative to that of the other (an input to the clock terminal $CL_1$).

On the other hand, the capacitor $C_1$ of the time constant circuit 14 begins to discharge through the resistors $R_3$ and $R_1$ in response to an output change from the high level state to the low level state of the output terminal $Q_2$ of the flip-flop circuit $FF_2$. Since this discharge period is set to be long, until a predetermined period $T_1$ (for example 10 sec.) lapses after the output change, the switching transistor $Tr_1$ of the detection sensitivity switching circuit 13 is maintained to be conductive. By this fact, since the capacitor $C_2$ is maintained to be earthed through the high value of resistor $R_4$, the dead zone setting circuit 15 remains to keep a high detection sensitivity.

At this time, if the azimuth of the reproducing head 1 is not correct and the phase of one of said phase comparing signals is in advance of that of the other, the inverse signal level at the output $O_1$ of the phase comparing circuit 8 becomes the high level $V_a$ due to a high level signal coming from the output terminal $Q_1$ of the flip-flop circuit $FF_1$. In this way, the level of the integral output of the first integrating circuit increases gradually from the reference voltage level $V_b$. When this output level exceeds the upper dead zone limit $V_b+1.2$ volt, the dead zone setting circuit 15 produces a high level signal, which closes the analogue switches $SW_1$ and $SW_2$. The high level voltage $V_b$ of the inverse signal is applied to the switching circuit 16 in response to this closure of the analogue switches $SW_1$ and $SW_2$. At this time, since the integral output of the second integrating circuit exceeds the reference voltage level $V_b$, the azimuth adjusting motor 10 begins to rotate in a determined direction and moves the reproducing head 1 so that the azimuth becomes correct.

When the azimuth of the reproducing head 1 passes through the correct position and the phase relation between two phase comparing signals is reversed, the level of the inverse output turns to the low level 0 inversely. Accordingly the output level of the second integrating circuit decreases, and when this output level becomes lower than the reference voltage level $V_b$, the motor 10 rotates in the reverse direction so that the azimuth of the reproducing head 1 returns to the correct position. In this way, the reproducing head 1 oscillates around the correct position of the azimuth, and its amplitude becomes smaller with faster repetition of the reverse of the inverse output.

On the other hand, the output level of the first integrating circuit decreases gradually in response to the repetition of the reverse of the inverse output, and when the output level enters into the dead zone region, the dead zone setting circuit 15 produces a low level signal, which opens the analogue switches $SW_1$ and $SW_2$. Due to this fact, the motor 10 stops and the reproducing head 1 lies still approximately at the correct position of the azimuth.

To the contrary, also when an azimuth adjustment operation starts from a state where one of said phase comparing signals is retarded in phase relative to the other, the reproducing head 1 lies still in the same way approximately at the correct position of the azimuth. However, in this case, switching on and off of the analogue switches $SW_1$ and $SW_2$ is effected with respect to the lower dead zone limit $V_b-1.2$ volt.

Such an azimuth adjustment operation finishes easily within the above-mentioned period of time $T_1$ during which the detection sensitivity is kept high. After the period of time $T_1$ has lapsed after the detection of an audio reproduced signal, the switching resistor $Tr_1$ of the detection sensitivity circuit 13 becomes non-conductive and the capacitor $C_2$ is connected parallel to the capacitor $C_3$, so that the detection sensitivity of the dead zone setting circuit 15 decreases. Owing to this, it is prevented that a reproducing head, which has been adjusted at the correct position of the azimuth, is move unnecessarily in response to an exceptional phase difference between the phase comparing signals due to, for example, breakage of the tape.

On the other hand, in the state where the detection sensitivity is set to be low the level detecting circuit 12 detects no audio reproducing signal. When the output terminal $Q_2$ of the flip-flop circuit $FF_2$ is provided with a high level signal, the low state of this detection sensitivity restores immediately. Consequently, the state where the detection sensitivity is high is necessarily restored at the beginning of a non-recorded portion between two pieces of music, etc. For example, when reproducing starts at an end portion of a piece of music, to which a non-recorded portion succeeds immediately, the azimuth of the reproducing head 1 is perfectly adjusted by an audio reproduced signal reproduced from the top of the following recorded piece of music.

As mentioned above, using by such a device the azimuth of the reproducing head is automatically adjusted by detecting advance or retardation in the phase of one of said phase comparing signals relative to the other, which can be obtained by dividing a single recording track into two portions and reproducing each of them.

Since the inverting signal drives the motor not directly but through a switching circuit, the reproducing head is not moved unnecessarily other than during the azimuth adjustment period, and also since high or low inverting signals are applied to the motor driving circuit not directly but through an integrating circuit, it is prevented that the motor begins to rotate suddenly at the beginning of an adjustment operation and at the same time that audio reproduced signals, which are taken out, are influenced by the azimuth adjustment operation.

Furthermore, it is obvious that the width of the dead zone, etc. can be arbitrarily chosen.

As explained above, a magnetic head according to this invention can be used as an reproducing head, and at the same time can be used to adjust automatically the azimuth thereof. Furthermore, using a magnetic head according to this invention, it is possible to utilize divided reproduced signals for tracking control, etc.

I claim:

1. An apparatus for reproducing a signal recorded on a magnetic tape, comprising:
   a magnetic head which includes a core having a single gap corresponding to a predetermined recording track of said magnetic tape, said core including left-hand right-hand core parts which are spaced in a direction of travel of said tape, each of said core parts including an uper core piece and a lower core piece, the ratio of the thickness of the upper core piece to the thickness of the lower core piece being less than 1 for one of said left-hand and right-hand core parts and being greater than 1 for the other thereof, said magnetic head further including first and second pick-up coils which each encircle a portion of the thicker core piece of a respective one of said left-hand and right-hand core parts;
   means supporting said magnetic head for movement in directions effecting variation of the azimuth position of said magnetic head relative to the magnetic tape; and
   means responsive to output signals from said first and second pick-up coils and cooperable with said magnetic head for causing movement of said magnetic head which adjusts the azimuth position of said magnetic head relative to a recorded signal on said recording track.

2. An apparatus for reproducing an audio signal recorded on a track of an elongate recording tape supported for lengthwise movement in a first direction, comprising a magnetic head which has a core and which can be positioned adjacent the tape so that the track on the tape having the audio signal thereon travels past said core during lengthwise movement of the tape in said first direction, said core having a single gap which extends in a second direction perpendicular to said first direction and having first and second core parts disposed on opposite sides of said gap, each said core part consisting of a first core piece and a second core piece which are adjacent and disposed on opposite sides of a plane extending parallel to said first direction and perpendicular to said second direction, said first core piece of said first core part being offset in said second direction from said second core piece thereof and said second core piece of said second core part being offset in said second direction from said first core piece thereof, said first core piece of each said core part having a thickness in said second direction which is greater than the thickness in said second direction of said second core piece thereof, said magnetic head further including first and second pick-up coils which each encircle a portion of a respective one of said first core pieces.

3. The apparatus according to claim 2, wherein said first core piece of each said core part has a surface facing said second core piece thereof, and has a recess in said surface through which the respective coil encircling the first core piece extends.

4. The apparatus according to claim 3, wherein said first and second core parts are each generally U-shaped and have spaced first and second legs which project outwardly toward the other of said core parts, the ends of said first legs of said core parts being adjacent and secured to each other, and the ends of said second legs having said gap therebetween, each said core piece being a generally U-shaped, platelike element.

5. The apparatus according to claim 2, including means supporting said magnetic head for movement in directions effecting variation of the azimuth position thereof relative to the magnetic tape, and means cooperable with said magnetic head and responsive to signals produced by said pick-up coils in response to said audio signal for causing movement of said magnetic head which adjusts the azimuth position of said magnetic head relative to the track on the recording tape.

* * * * *